(12) United States Patent
Clark et al.

(10) Patent No.: US 12,540,578 B2
(45) Date of Patent: Feb. 3, 2026

(54) HYBRID ELECTRIC GAS TURBINE ENGINE TWO SPEED TRANSMISSION FOR LOW SPOOL DRIVE POWER INJECTION AND POWER EXTRACTION

(71) Applicant: RTX Corporation, Farmington, CT (US)

(72) Inventors: Thomas E. Clark, Wells, ME (US); Paul R. Hanrahan, Sedona, AZ (US); Andrew E. Breault, Bolton, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/404,185

(22) Filed: Jan. 4, 2024

(65) Prior Publication Data

US 2025/0223925 A1    Jul. 10, 2025

(51) Int. Cl.
*F02C 7/32* (2006.01)
*F02C 7/36* (2006.01)
*F16H 37/06* (2006.01)
*F16H 57/038* (2012.01)
*F16H 57/02* (2012.01)

(52) U.S. Cl.
CPC ............ *F02C 7/32* (2013.01); *F02C 7/36* (2013.01); *F16H 37/065* (2013.01); *F16H 57/038* (2013.01); *F05D 2260/4031* (2013.01); *F16H 2057/02013* (2013.01); *F16H 2057/02034* (2013.01); *F16H 2057/02082* (2013.01); *F16H 2200/0034* (2013.01)

(58) Field of Classification Search
CPC . F02C 7/32; F05D 2220/75; F05D 2260/4023
See application file for complete search history.

(56) References Cited

U.S. PATENT DOCUMENTS

| | | |
|---|---|---|
| 7,942,079 B2 | 5/2011 | Russ |
| 9,938,850 B2 * | 4/2018 | Edwards .................. F02C 7/32 |
| 10,336,461 B2 * | 7/2019 | Mackin ................. F01D 15/10 |
| 10,422,243 B2 | 9/2019 | Suciu et al. |
| 10,563,591 B2 * | 2/2020 | Muldoon ............... F01D 15/10 |
| 10,590,852 B2 | 3/2020 | Suciu et al. |
| 11,248,523 B2 | 2/2022 | Leque et al. |
| 11,333,077 B2 * | 5/2022 | Foutch ................... F01D 25/34 |
| 11,591,967 B2 * | 2/2023 | Foutch ..................... F02C 7/32 |
| 2019/0218977 A1 | 7/2019 | Muldoon |
| 2020/0355122 A1 | 11/2020 | Foutch et al. |

FOREIGN PATENT DOCUMENTS

WO    WO-2008082335 A1 *    7/2008    ............. F02C 7/275

OTHER PUBLICATIONS

European Search Report for counterpart EP Application No. 24221300 dated May 6, 2025.

* cited by examiner

*Primary Examiner* — Justin D Seabe
(74) *Attorney, Agent, or Firm* — Bachman & LaPointe, P.C.

(57) ABSTRACT

A hybrid electric gas turbine engine two speed transmission for a low spool drive including an accessory gearbox in operative communication with a low speed spool motor-generator; a transmission in operative communication with the accessory gearbox and the low speed spool motor-generator; a low speed spool angled gearbox in operative communication with the transmission; and a low speed spool in operative communication with the low speed spool angled gearbox.

13 Claims, 9 Drawing Sheets

HYBRID ELECTRIC GAS TURBINE ENGINE TWO SPEED TRANSMISSION FOR LOW SPOOL DRIVE POWER INJECTION AND POWER EXTRACTION

BACKGROUND

The present disclosure is directed to the improved hybrid electric gas turbine engine two speed transmission for low spool drive.

Hybrid electric gas turbine engines, in a parallel-hybrid arrangement, require coupling of electric machines referred to as motor-generators MG, to the main shafts of the engine to provide power extraction and power injection, see FIG. 1. Typically, this is done by mounting the motor-generators MG to an accessory gearbox AG. In gearbox mounted arrangements, a high spool HS towershaft and low spool LS towershaft are provided to mechanically link the motor-generators MG to the main shafts of the engine. In certain arrangements the machines are directly driven with a fixed gear ratio off the accessory gearbox AG, without a transmission. Therefore, the motor-generators MG are then optimized to the speed ranges of the N1 and N2 spools across idle to redline mechanical shaft speeds. Low spool speed ranges are large, and as a result impose significant design challenges on motor-generator design, and thermal management.

SUMMARY

In accordance with the present disclosure, there is provided a hybrid electric gas turbine engine two speed transmission for a low spool drive comprising an accessory gearbox in operative communication with a low speed spool motor-generator; a transmission in operative communication with the accessory gearbox and the low speed spool motor-generator; a low speed spool angled gearbox in operative communication with the transmission; and a low speed spool in operative communication with the low speed spool angled gearbox.

A further embodiment of any of the foregoing embodiments may additionally and/or alternatively include the accessory gearbox is in operative communication with an oil pump and a fuel pump.

A further embodiment of any of the foregoing embodiments may additionally and/or alternatively include the accessory gearbox is in operative communication with a first high speed spool motor-generator and a second high speed spool motor-generator.

A further embodiment of any of the foregoing embodiments may additionally and/or alternatively include the accessory gearbox is in operative communication with a high speed spool via a high speed spool angled gearbox.

A further embodiment of any of the foregoing embodiments may additionally and/or alternatively include the transmission and low speed spool angled gearbox are integrally formed sharing a common housing.

A further embodiment of any of the foregoing embodiments may additionally and/or alternatively include the transmission comprises a two speed transmission configured for hybrid electric low spool drive applications.

A further embodiment of any of the foregoing embodiments may additionally and/or alternatively include the transmission is bolted to the accessory gearbox configured as a line removeable unit.

In accordance with the present disclosure, there is provided a hybrid electric gas turbine engine two speed transmission for a low spool drive comprising an engine structure proximate a compressor of the gas turbine engine; a low speed spool towershaft coupled to the engine structure; a low speed spool angled gearbox in operative communication with the towershaft and in operative communication with a low speed spool of the gas turbine engine; a transmission in operative communication with the low speed spool angled gearbox; an accessory gearbox in operative communication with the transmission; and a low speed spool motor-generator in operative communication with the accessory gearbox.

A further embodiment of any of the foregoing embodiments may additionally and/or alternatively include the transmission is bolted to the accessory gearbox configured as a line removeable unit.

A further embodiment of any of the foregoing embodiments may additionally and/or alternatively include the transmission and low speed spool angled gearbox are integrally formed sharing a common housing.

A further embodiment of any of the foregoing embodiments may additionally and/or alternatively include the transmission comprises a two speed transmission configured for hybrid electric low spool drive applications.

A further embodiment of any of the foregoing embodiments may additionally and/or alternatively include the accessory gearbox is in operative communication with a first high speed spool motor-generator and a second high speed spool motor-generator.

A further embodiment of any of the foregoing embodiments may additionally and/or alternatively include the accessory gearbox is in operative communication with a high speed spool via a high speed spool angled gearbox.

In accordance with the present disclosure, there is provided a process for a hybrid electric gas turbine engine two speed transmission for a low spool drive comprising: providing an engine structure proximate a compressor of the gas turbine engine; coupling a low speed spool towershaft to the engine structure; coupling a low speed spool angled gearbox in operative communication with the towershaft; coupling the low speed spool angled gearbox in operative communication with a low speed spool of the gas turbine engine; coupling a transmission in operative communication with the low speed spool angled gearbox; coupling an accessory gearbox in operative communication with the transmission; and coupling a low speed spool motor-generator in operative communication with the accessory gearbox.

A further embodiment of any of the foregoing embodiments may additionally and/or alternatively include the process further comprising integrally forming the transmission and low speed spool angled gearbox sharing a common housing.

A further embodiment of any of the foregoing embodiments may additionally and/or alternatively include the process further comprising configuring the transmission as a two speed transmission configured for hybrid electric low spool drive applications.

A further embodiment of any of the foregoing embodiments may additionally and/or alternatively include the process further comprising configuring the two-speed transmission for two operational modes.

A further embodiment of any of the foregoing embodiments may additionally and/or alternatively include the two operational modes comprises a first operational MODE 1 configured as a direct drive to the low spool motor-generator for high speed operation of the low speed spool; and a second operational MODE 2 configured to provide up to a 3× increase in motor shaft speed wherein the transmission includes a gear ratio of 3.0 which increases motor speed for low speed spool operation selected from the group comprising a ground idle speed and a flight idle speed.

A further embodiment of any of the foregoing embodiments may additionally and/or alternatively include the process further comprising configuring the transmission for a low spool drive power extraction wherein the low spool drive power extraction is arranged for A/C loads and battery recharge.

A further embodiment of any of the foregoing embodiments may additionally and/or alternatively include the process further comprising configuring the transmission for a low spool drive power injection on ground.

Other details of the hybrid electric gas turbine engine two speed transmission for fan drive are set forth in the following detailed description and the accompanying drawings wherein like reference numerals depict like elements.

DETAILED DESCRIPTION

Figure 1:
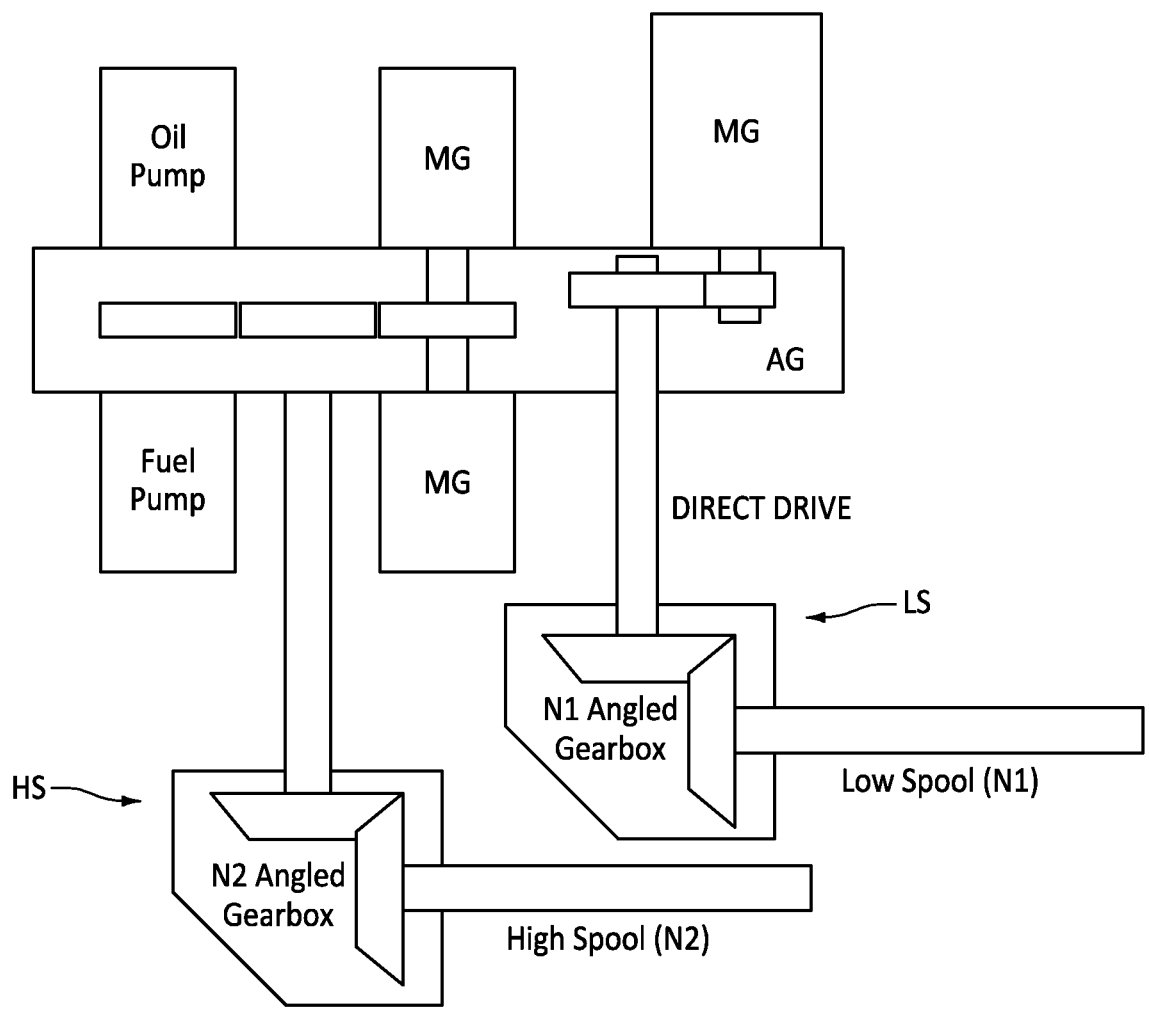
FIG. 1 is a schematic representation of a Prior Art turbofan gearbox architecture.
Figure 2:
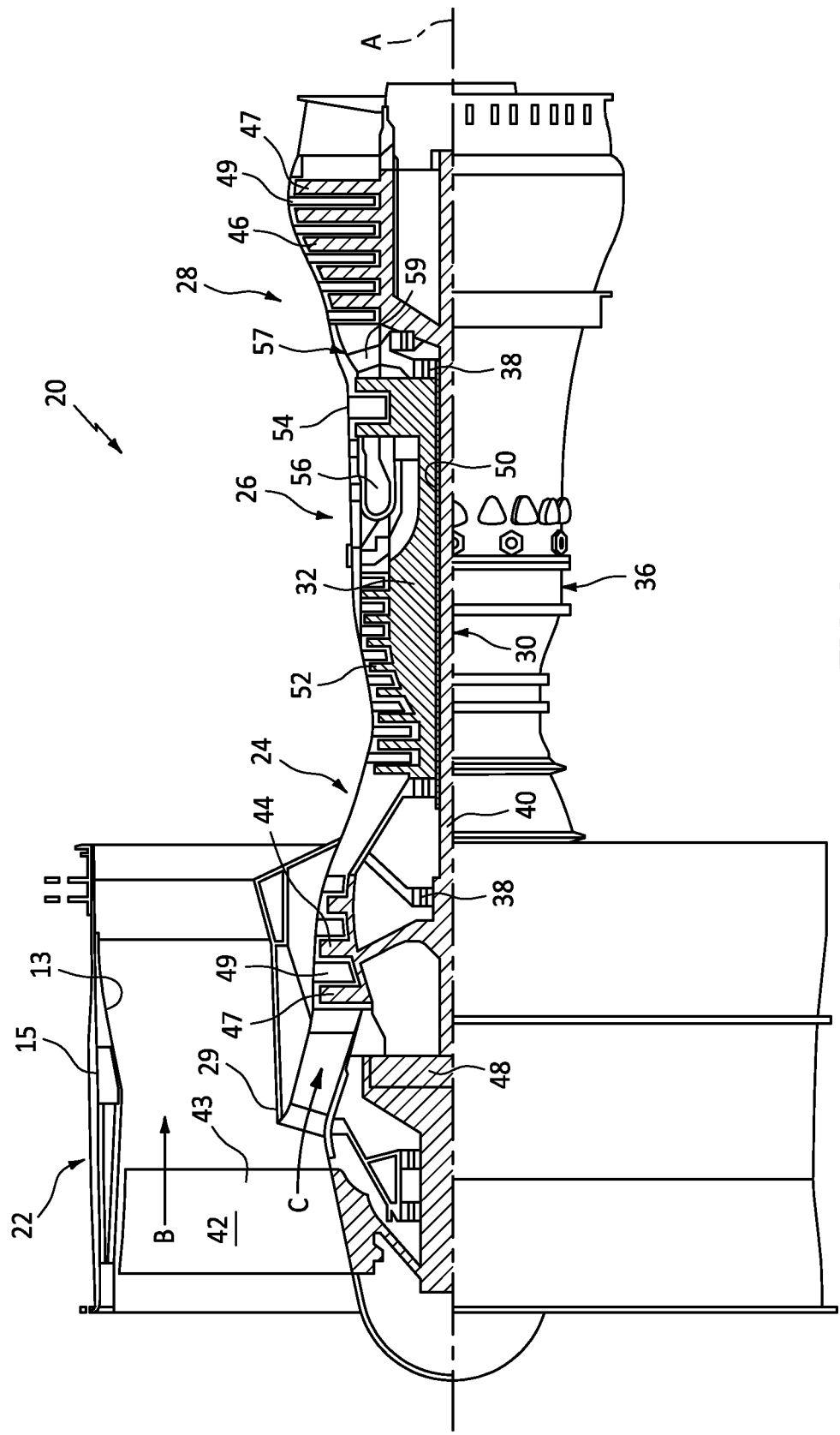
FIG. 2 is a cross section view of an exemplary gas turbine engine.

FIG. 2 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. Additionally, although depicted as a single fan encased in a housing 15, this disclosure may alternatively apply to turbine engines with dual fan and/or open rotor systems.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and low spool drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

Figure 3:
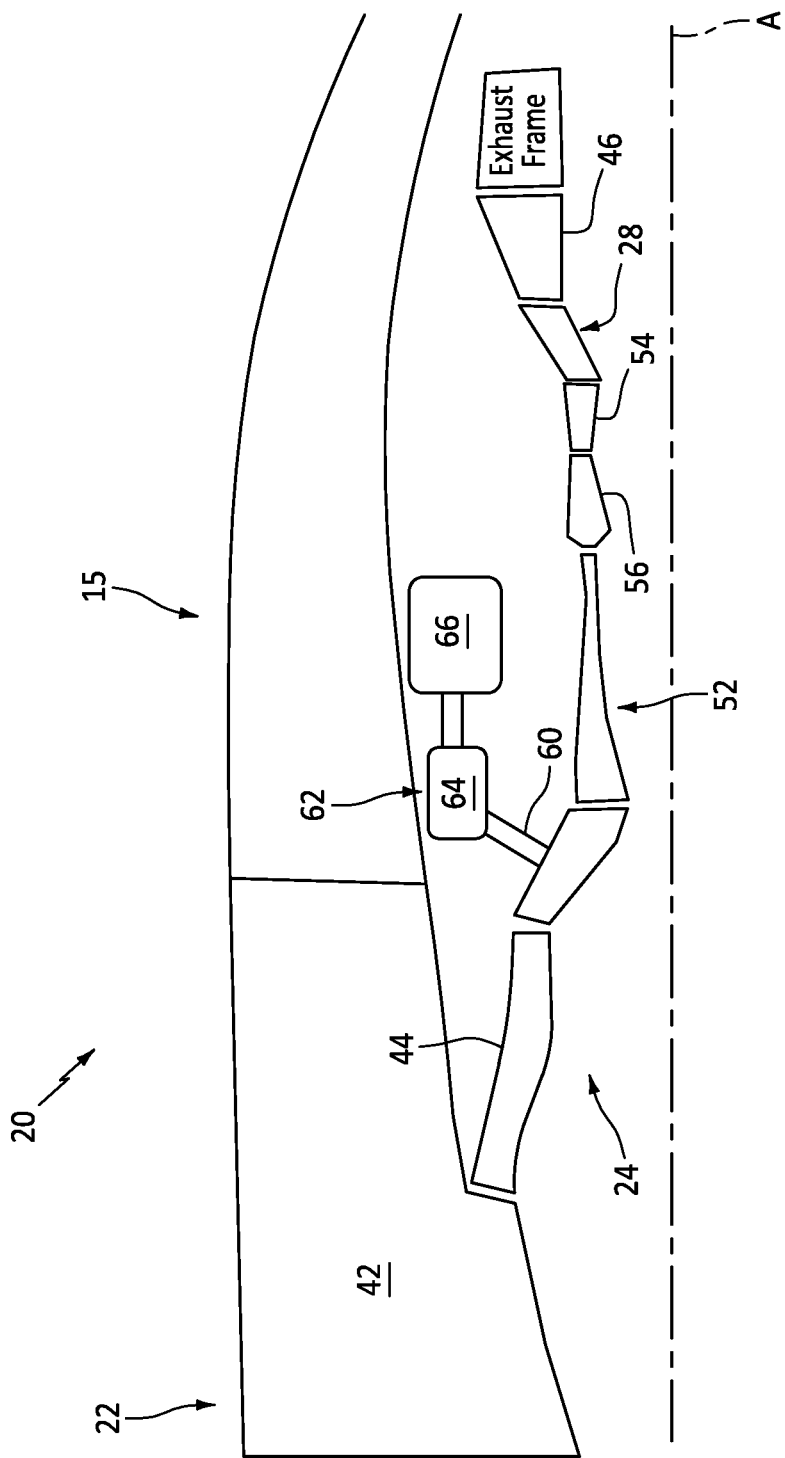
FIG. 3 is a schematic representation of a turbofan engine with core mounted gearbox.
Figure 4:
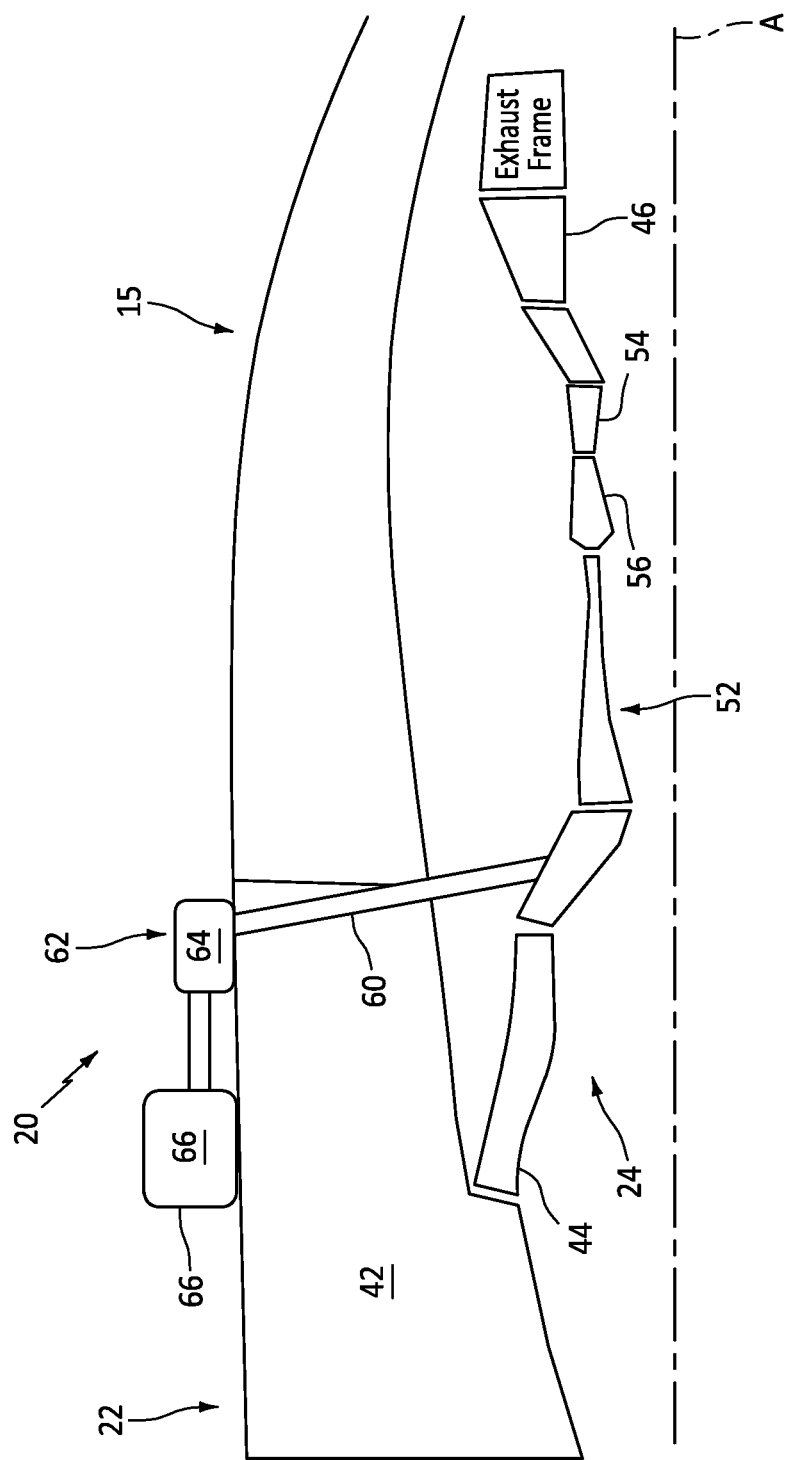
FIG. 4 is a schematic representation of a turbofan engine with fan mounted gearbox.

Referring also to FIG. 3 and FIG. 4, the engine 20 schematic includes different mounting schemes. As seen at FIG. 3, a core mounted scheme includes a towershaft 60 in operative communication with the compressor section 24. The towershaft 60 is in operative communication with an angled gear box 62 that includes bevel gears 64. A main gearbox 66 is in operative communication with the angled gear box 62. FIG. 4 shows an alternative fan mounted scheme that includes the towershaft 60 in operative communication with the compressor section 24. The towershaft 60 extends to the fan section 22. The main gearbox 66 is in operative communication with the angled gear box 62 coupled with the towershaft 60. In this embodiment, the main gearbox 66 and angled gear box 62 are located in the fan section 22, mounted to the nacelle 15.

Figure 5:
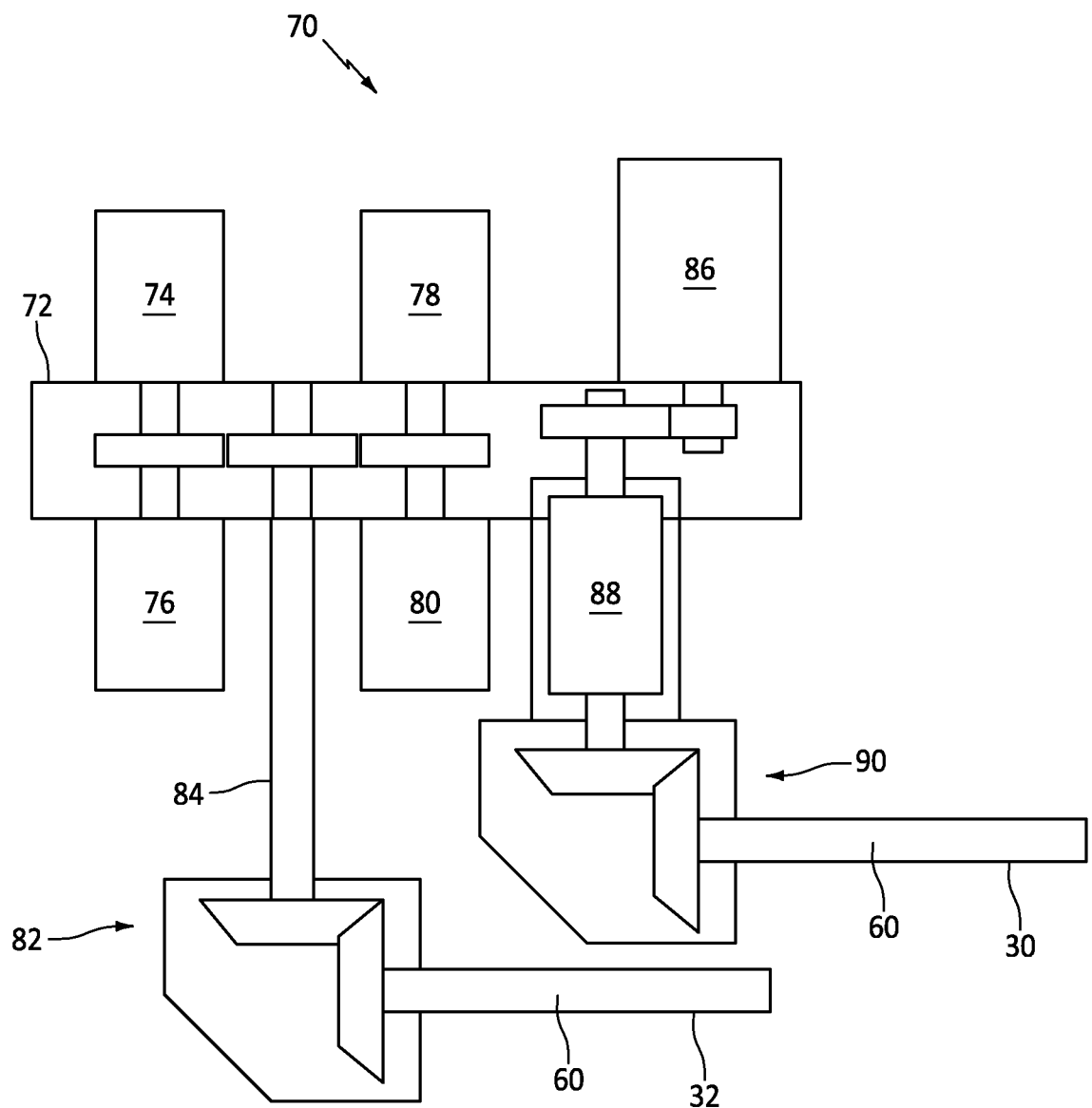
FIG. 5 is a schematic representation of an exemplary hybrid electric gas turbine engine two speed transmission for low spool drive.
Figure 6:
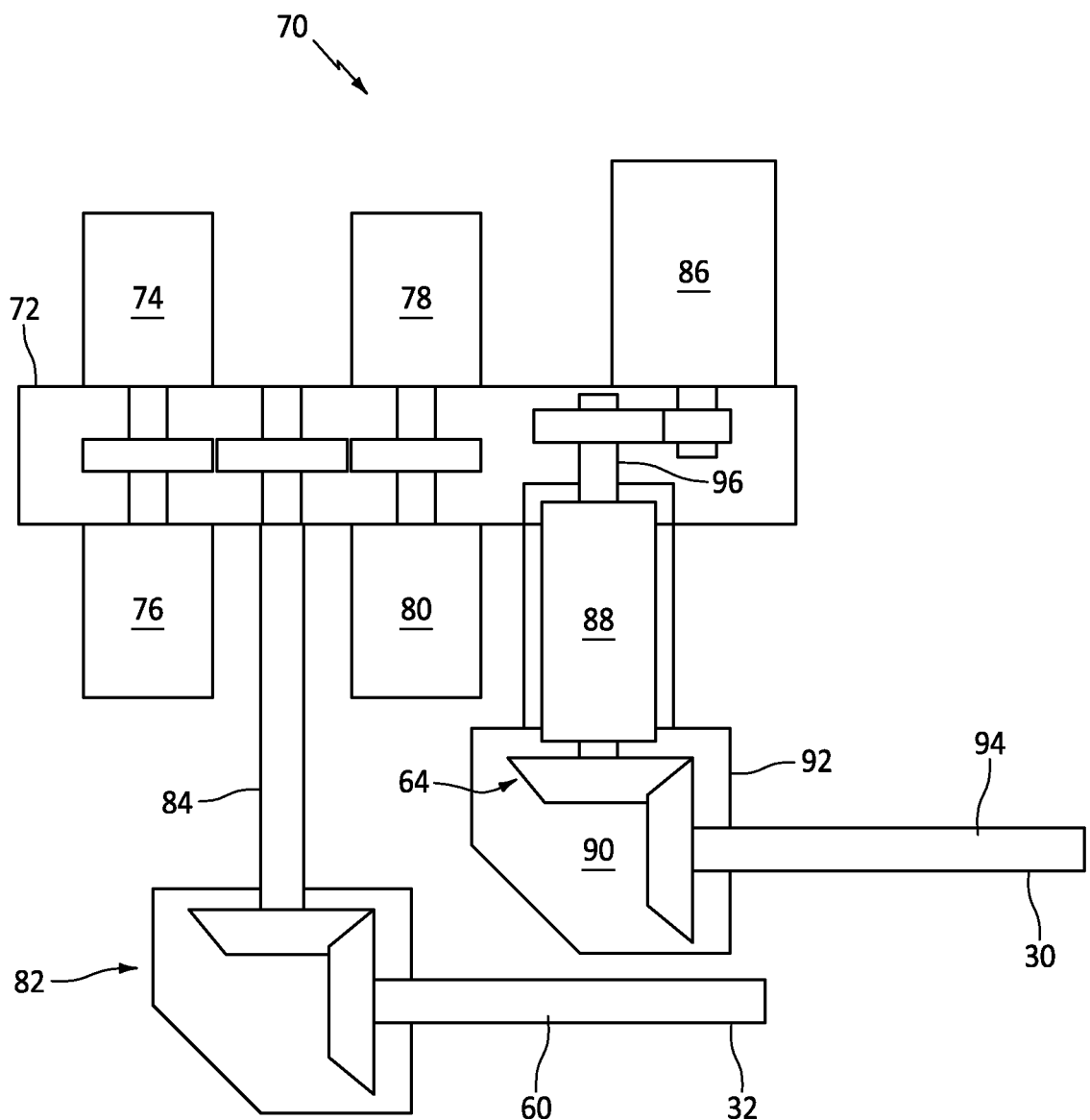
FIG. 6 is a schematic representation of an exemplary hybrid electric gas turbine engine two speed transmission for low spool drive.

Referring also to FIG. 5 and FIG. 6, showing embodiments of a hybrid electric gas turbine engine two speed transmission for low spool drive 70. An accessory gearbox 72 is in operative communication with exemplary components; an oil pump 74 and fuel pump 76. A first high speed spool N2 motor-generator 78 and a second high speed spool N2 motor-generator 80 are in operative communication with the accessory gearbox 72. The N2 motor-generators 78, 80 provide electrically driven rotary energy into the accessory gearbox 72.

An N2 angled gearbox 82 is in operative communication with the accessory gearbox 72 via N2 coupling shaft 84. The N2 angled gearbox 82 is in operative communication with the high speed spool 32 (N2). The N2 motor-generators provide rotary motion energy to the high speed spool 32 under predetermined engine operational modes.

An N1 low speed spool motor-generator 86 is in operative communication with the accessory gearbox 72. As seen at FIG. 5, a transmission 88 is in operative communication with the accessory gearbox 72 and driven by the N1 motor-generator 86. The final gear ratio of the N1 motor-generator 86 can be provided within the accessory gearbox 72. The transmission 88 is also in operative communication with an N1 low speed spool angled gearbox 90. The N1 angled gearbox 90 is in operative communication with the low speed spool 30 (N1) via towershaft 60. The transmission 88 can be a two-speed transmission. The transmission 88 can be a line removeable unit that is bolted to the accessory gearbox 72. The transmission 88 can be bolted to the N1 angled gear box 90, with each being separate units as shown in FIG. 5.

Referring also to FIG. 6, the transmission 88 and N1 angled gearbox 90 are integrally formed sharing a common housing 92. The housing 92 can be a line removable unit that is bolted to the accessory gearbox 72.

The transmission 88 comprises a two speed transmission for hybrid electric low spool drive applications. The transmission 88 comprises clutch packs and an epicyclic geartrain configured to reduce the speed range at the low speed spool N1 motor-generator 86. The transmission 88 is attached to the core-mounted accessory gearbox 72 and utilizes a low speed spool towershaft 94 as an input coupling. The transmission 88 is integrally housed with the N1 angled gearbox 90. N1 angled gearbox 90 includes bevel gears 64 at the input, and an N2 coupling shaft 96 at the output for the accessory gearbox 72.

Figure 7:
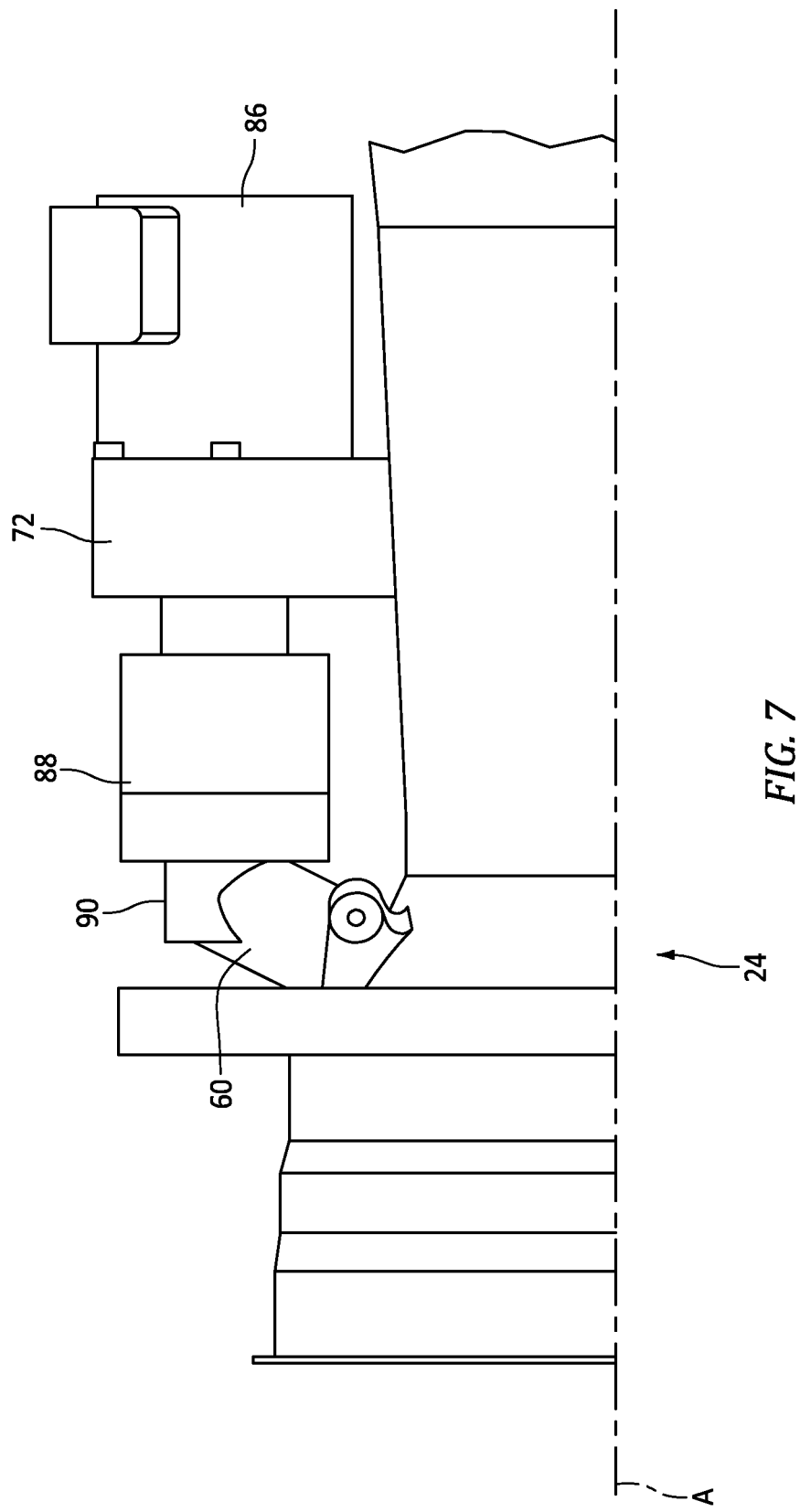
FIG. 7 is an isometric view of an exemplary hybrid electric gas turbine engine two speed transmission for low spool drive.

Referring also to FIG. 7 an exemplary hybrid electric gas turbine engine two speed transmission for low spool drive 70 is shown. The hybrid electric gas turbine engine two speed transmission for low spool drive 70 is a core mounted scheme with a towershaft 60 in operative communication with the compressor section 24. The N1 angled gearbox 90 is shown coupled to the towershaft 60. The transmission 88 is coupled to the N1 angled gearbox 90. The transmission 88 is coupled to the accessory gearbox 72. The accessory gearbox 72 is coupled to the motor-generator 86.

Figure 8:
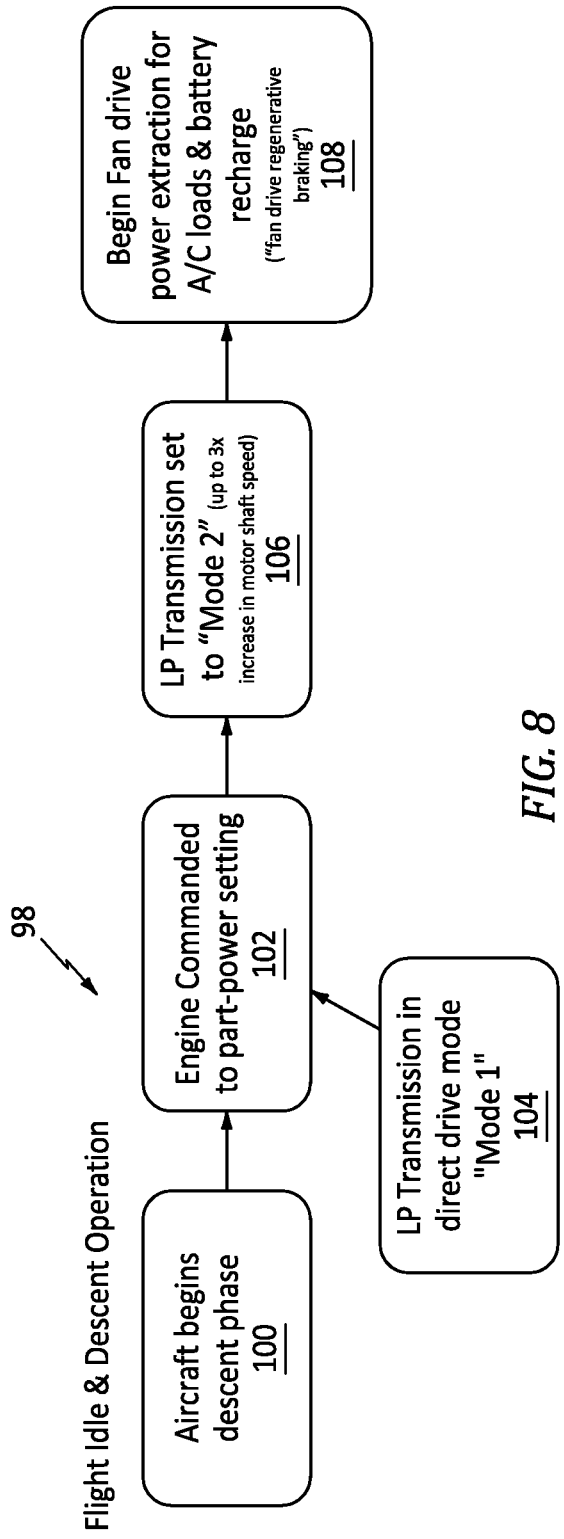
FIG. 8 is an exemplary process map for flight operation.
Figure 9:
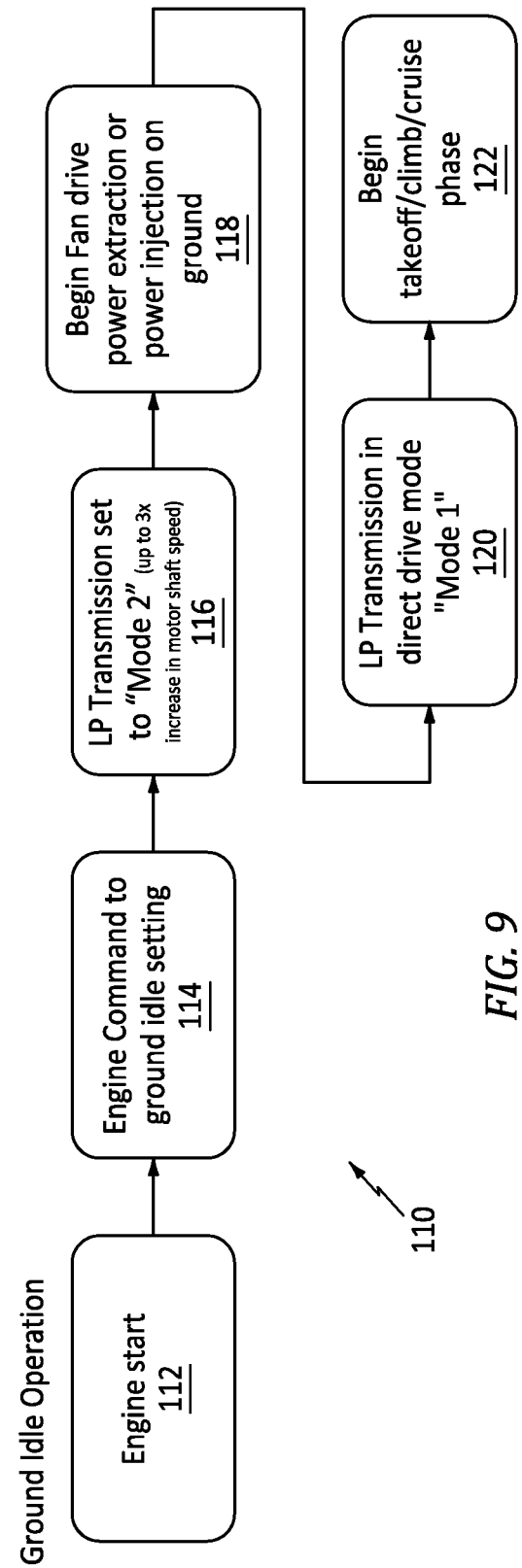
FIG. 9 is an exemplary process map for ground idle operation.

Referring also to FIG. 8 and FIG. 9, process maps are shown. Though illustrated as distinct steps, two or more of the steps 100-108 and 112-122 of FIG. 8 and FIG. 9, respectively, may, in some examples, occur simultaneously. The two-speed transmission 88 is designed for two operational modes and associated gear ratios. FIG. 8 shows a flight idle and a descent operation 98. The operational MODE 1 reflects a direct drive to the low spool motor-generator 86 for high N1 speed operation. The aircraft is in operation and begins a descent phase at step 100. At step 102, the engine associated with the aircraft is commanded to a partial-power setting. The partial-power setting can include any setting from flight idle to just below a maximum position of the throttle, power control lever, or the like. At step 104 the transmission is in a direct drive mode, that is operational MODE 1. At step 106 the transmission is set to operational MODE 2. In MODE 2 the system 70 can provide a nominally 3× increase in motor shaft speed. At step 108 the low spool drive power extraction proceeds. The low spool drive power extraction for A/C loads and battery recharge can be accomplished. At this step 108 the low spool drive is in a regenerative braking arrangement.

FIG. 9 shows a ground idle operation process schematic 110. The step 112 includes an engine start typically with the aircraft on the ground. At step 114 an engine command to a ground idle setting for the engine. At step 116 the transmission is set to operational MODE 2 which reflects a nominal gear ratio of 3.0 (range from 2.0 to 4.0) which increases motor speed for low N1 speed operation such as ground and flight idle. The transmission 88 reduces the overall N1 speed range at the low spool motor-generator 86. At step 118 the low spool drive power extraction can be initiated or a power injection on ground can be initiated. At step 120 the transmission can be set to operational MODE 1, direct drive mode. At step 122 the aircraft can begin a takeoff or climb or cruise phase.

Figure 10:
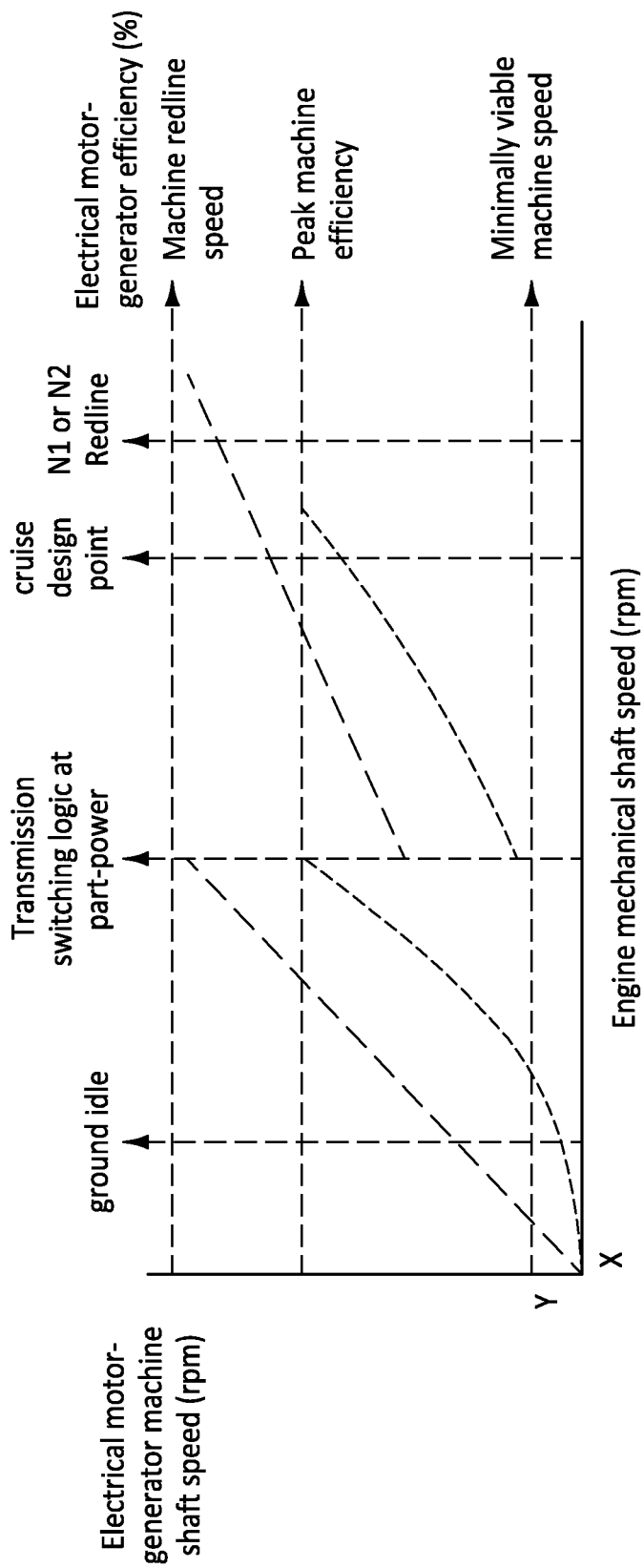
FIG. 10 is an exemplary motor-generator duty cycle graphic.

Referring also to FIG. 10 a motor-generator duty cycle with the 2-speed transmission graph is shown. The plots of electrical motor-generator machine shaft speed in revolutions per minute (rpm) are shown graphically in dashed lines. The plots for electrical motor-generator efficiency in percentage (%) are shown as dotted lines. The graphic along the horizontal X-axis includes a spectrum of engine mechanical shaft speed (rpm) from a zero speed through a ground idle speed, a partial-power speed, a cruise design point speed, an N1 and N2 redline speed and beyond. The graphic along the vertical Y-axis includes the motor efficiency from a minimally viable machine speed, to each machine efficiency up to a machine redline speed. The graphic demonstrates that the exemplary hybrid electric gas turbine engine two speed transmission for low spool drive 70 during increased motor-generator shaft speeds near ground & flight idle can provide improved power extraction and power injection performance, by enabling improved machine efficiency.

A technical advantage provided by the disclosed hybrid electric gas turbine engine two speed transmission for low spool drive can include electrical motor-generator operational optimization.

Another technical advantage provided by the disclosed hybrid electric gas turbine engine two speed transmission for low spool drive can include reduced motor-generator machine volume. As electric machine speed decreases, so does its output voltage. Providing high power at low speed means current must increase. Machine volume is known to increase with current. By raising the machine speed at low engine speed with the two speed transmission, maximum current is decreased, along with required volume.

Another technical advantage provided by the disclosed hybrid electric gas turbine engine two speed transmission for low spool drive can include enabling low spool motor-generator optimization to a reduced speed range, enabling smaller machine envelope, reduced machine weight, increased machine thermal efficiency, and reduced torque requirements at low machine speeds.

Another technical advantage provided by the disclosed hybrid electric gas turbine engine two speed transmission for low spool drive can include a reduction in thermal management system demand, from improved thermal efficiency of the machine.

Another technical advantage provided by the disclosed hybrid electric gas turbine engine two speed transmission for low spool drive can include a reduction in the weight of support equipment, including power cables and machine speed control units, which can operate with lower maximum current.

Another technical advantage provided by the disclosed hybrid electric gas turbine engine two speed transmission for low spool drive can include a reduction in cable ventilation requirements, due to cooler cables (Joule heating effect-reduced current through the phase cables).

Another technical advantage provided by the disclosed hybrid electric gas turbine engine two speed transmission for low spool drive can include an overall weight reduction opportunity estimated at −20 kg including transmission weight.

There has been provided a hybrid electric gas turbine engine two speed transmission for low spool drive. While the hybrid electric gas turbine engine two speed transmission for low spool drive has been described in the context of specific embodiments thereof, other unenumerated alternatives, modifications, and variations may become apparent to those skilled in the art having read the foregoing description. Accordingly, it is intended to embrace those alternatives, modifications, and variations which fall within the broad scope of the appended claims.

What is claimed is:

1. A hybrid electric gas turbine engine two speed transmission for a low spool drive comprising: an accessory gearbox in operative communication with a low speed spool motor-generator; a transmission in operative communication with the accessory gearbox and the low speed spool motor-generator, wherein the transmission comprises a two speed transmission configured for hybrid electric low spool drive applications, the two speed transmission comprises clutch packs and an epicyclic geartrain configured to reduce a speed range at the low speed spool motor-generator; a low speed spool angled gearbox in operative communication with the transmission; and a low speed spool in operative communication with the low speed spool angled gearbox, wherein the accessory gearbox is in operative communication with a first high speed spool motor-generator and a second high speed spool motor-generator, and wherein the accessory gearbox is in operative communication with a high speed spool via a high speed spool angled gearbox.

2. The hybrid electric gas turbine engine two speed transmission for a low spool drive according to claim 1, wherein the accessory gearbox is in operative communication with an oil pump and a fuel pump.

3. The hybrid electric gas turbine engine two speed transmission for a low spool drive according to claim 1, wherein the transmission and low speed spool angled gearbox are integrally formed sharing a common housing.

4. The hybrid electric gas turbine engine two speed transmission for a low spool drive according to claim 1, wherein the transmission is bolted to the accessory gearbox configured as a line removeable unit.

5. A hybrid electric gas turbine engine two speed transmission for a low spool drive comprising: an engine structure proximate a compressor of the gas turbine engine; a low speed spool towershaft coupled to the engine structure; a low speed spool angled gearbox in operative communication with the towershaft and in operative communication with a low speed spool of the gas turbine engine; a transmission in operative communication with the low speed spool angled gearbox, wherein the transmission comprises a two speed transmission configured for hybrid electric low spool drive applications, the two speed transmission comprises clutch packs and an epicyclic geartrain configured to reduce a speed range at the low speed spool motor-generator; an accessory gearbox in operative communication with the transmission; and a low speed spool motor-generator in operative communication with the accessory gearbox, wherein the accessory gearbox is in operative communication with a first high speed spool motor-generator and a second high speed spool motor-generator, and wherein the accessory gearbox is in operative communication with a high speed spool via a high speed spool angled gearbox.

6. The hybrid electric gas turbine engine two speed transmission for a low spool drive according to claim 5, wherein the transmission is bolted to the accessory gearbox configured as a line removeable unit.

7. The hybrid electric gas turbine engine two speed transmission for a low spool drive according to claim 5, wherein the transmission and low speed spool angled gearbox are integrally formed sharing a common housing.

8. A process for a hybrid electric gas turbine engine two speed transmission for a low spool drive comprising: providing an engine structure proximate a compressor of the gas turbine engine; coupling a low speed spool towershaft to the engine structure; coupling a low speed spool angled gearbox in operative communication with the towershaft; coupling the low speed spool angled gearbox in operative communication with a low speed spool of the gas turbine engine; coupling a transmission in operative communication with the low speed spool angled gearbox, configuring the transmission as a two speed transmission configured for hybrid electric low spool drive applications, the two speed transmission comprises clutch packs and an epicyclic geartrain; configuring the clutch packs and epicyclic geartrain to reduce a speed range at the low speed spool motor-generator; coupling an accessory gearbox in operative communication with the transmission; and coupling a low speed spool motor-generator in operative communication with the accessory gearbox, wherein the accessory gearbox is coupled in operative communication with a first high speed spool motor-generator and a second high speed spool motor-generator, and wherein the accessory gearbox is coupled in operative communication with a high speed spool via a high speed spool angled gearbox.

9. The process of claim 8, further comprising:
integrally forming the transmission and low speed spool angled gearbox sharing a common housing.

10. The process of claim 8, further comprising:
configuring the two-speed transmission for two operational modes.

11. The process of claim 8, wherein the two operational modes comprise:
a first operational MODE 1 configured as a direct drive to the low spool motor-generator for high speed operation of the low speed spool; and
a second operational MODE 2 configured to provide up to a 3× increase in motor shaft speed wherein the transmission includes a gear ratio of 3.0 which increases motor speed for low speed spool operation selected from the group comprising a ground idle speed and a flight idle speed.

12. The process of claim 8, further comprising:
configuring the transmission for a low spool drive power extraction wherein the low spool drive power extraction is arranged for A/C loads and battery recharge.

13. The process of claim 8, further comprising:
configuring the transmission for a low spool drive power injection on ground.

* * * * *